United States Patent
Redfern

[11] 3,825,320
[45] July 23, 1974

[54] HIGH-PRESSURE OPTICAL BULKHEAD PENETRATOR

[75] Inventor: John T. Redfern, La Jolla, Calif.

[73] Assignee: The United States of America as represented by the Secretary of the Navy, Washington, D.C.

[22] Filed: Mar. 2, 1973

[21] Appl. No.: 337,492

[52] U.S. Cl. .............................. 350/96 B, 350/96 R
[51] Int. Cl. ............................................. G02b 5/16
[58] Field of Search............ 350/96 R, 96 B, 96 WG

[56] References Cited
UNITED STATES PATENTS

| | | | |
|---|---|---|---|
| 3,001,462 | 9/1961 | D'Oplinter | 95/11 W |
| 3,051,035 | 8/1962 | Root | 350/96 B |
| 3,455,625 | 7/1969 | Brumley et al. | 350/96 B |
| 3,618,526 | 11/1971 | Baker | 350/96 B X |
| 3,663,822 | 5/1972 | Uchida | 350/175 GN X |
| 3,740,116 | 6/1973 | Andrews | 350/96 B |

FOREIGN PATENTS OR APPLICATIONS

| | | | |
|---|---|---|---|
| 1,017,354 | 1/1966 | Great Britain | 350/96 B |

*Primary Examiner*—David H. Rubin
*Attorney, Agent, or Firm*—Richard S. Sciascia; Ervin F. Johnston; Thomas G. Keough

[57] ABSTRACT

A fitting including a bushing extending through a high-pressure hull provides a multichannel data capability while possessing resistance to an extreme pressure differential. A cylindrical or tapered plug of glass having a graded refractive index or a cylindrical or tapered bundle of fiber optics is bonded within an accommodatingly shaped bore coaxially disposed in the bushing. Having such a configuration and manner of construction allows the fitting to be of reduced size with respect to contemporary electrical hull-penetrators, yet a much greater data transfer capability is provided and this fitting will stand up under the crushing pressures encountered at extreme ocean depths.

9 Claims, 2 Drawing Figures

PATENTED JUL 23 1974 3,825,320

HIGH-PRESSURE OPTICAL BULKHEAD PENETRATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Submersibles, as well as surface vessels, routinely carry instrumentation and control functions outside of their hulls. Usually, the practice followed by marine designers is to provide at least one hull-penetrator carrying an electrical conductor per external function to serve as the conduit for external power, for data channels, or to facilitate command and control. In the case of submersibles designed to operate at extreme ocean depths, problems arising from having a multiplicity of hull penetrators should be avoided whenever possible.

Because of the imposing structural demands created by the crushing ambient pressures, it is essential that the structural integrity of submersibles remain unimpaired. An excessive amount of hull penetrators tends to destroy this integrity and poses a hazard to the crew and equipment. In addition, when a number of electrical conductors extend through a single hull penetrator problems associated with cross talk and cross coupling begin to appear. For example, where relatively low-power signals are being fed from the outside of a pressure hull to equipment within the submersible, as is the case, when responsive signals are generated by hydrophones, a low signal-to-noise ratio caused by cross talk might very well render the information signals unuseable. Coaxial cables are unsuitable for being fed through a high-pressure-differential fitting so that the cross talk problem remains. There is a continuing need in the state of the art for a fitting which serves as a multichannel data link through a pressure hull having a high pressure differential impressed across it.

SUMMARY OF THE INVENTION

The present invention is directed to provide an improved fitting extending through a structural member separating a high-pressure medium from a lower-pressure medium which enables the optical transmission of data. At opposite ends of the fitting, suitable means are mounted for transferring optical signals representative of data for further processing. A coaxial bore extending the length of the fitting is shaped to accommodate a cylindrically shaped glass member having a graded refractive index or a bundle of tapered fiber optics for passing data in at least one channel. A suitable adhesive, such as epoxy resins, polyeurethane resin, etc., bonds the cylinder or the tapered fiber optics within the coaxial bore to prevent failure from the crushing ambient pressure differential.

It is a prime object of the invention to provide an improved hull penetrator.

Another object of the invention is to provide a hull penetrator having a multichannel data transfer capability.

Still another object is to provide a hull penetrator designed to eliminate cross talk between adjacent data channels.

Still another object is to provide a hull penetrator designed to minimize the degradation of a hull's structural integrity.

Yet another object is to provide a hull penetrator of reduced size by having a bundle of fiber optics serving as a multichannel data link.

A further object is to provide a hull penetrator having a multichannel capability by reason of its inclusion of a cylindrically shaped optical transmission element having a graded refractive index.

These and other objects of the invention will become more readily apparent from the ensuing specification when taken with the drawings.

DESCRIPTION OF THE PREFERRED EMBODIMENT

Figure 1:
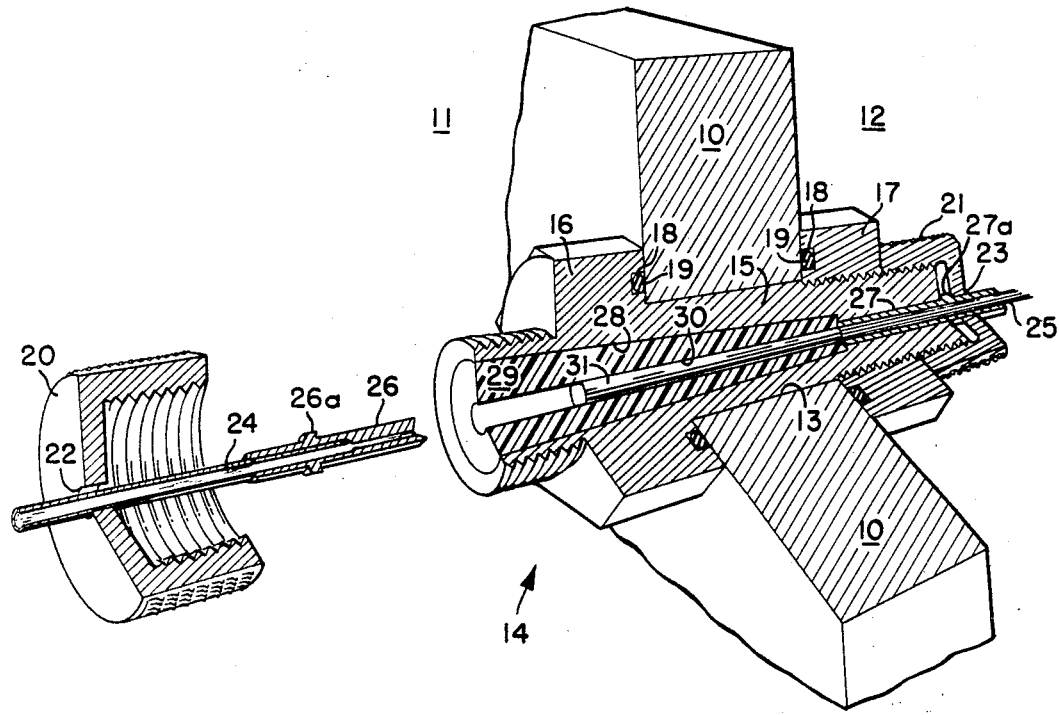
FIG. 1 is an isometric depiction partially in section of a preferred form of the invention.

Referring now to the drawings, a section of a pressure hull 10 having a thickness of several inches is shown separating a high-pressure medium 11, sea water at an extreme depth, from a lower pressure medium 12, the interior of a submersible. Conventionally, such a hull is high-yield steel, but recent technological developments indicate that acrylic and glass hulls will become more widely used in deep-diving submersibles. Irrespective of whichever hull material is chosen, an appropriately sized aperture 13 is bored through the pressure hull and is suitably machined to receive the invention, a data-transmitting fitting 14.

The inner walls of aperture 13 are machined and polished to present a smooth, uniform surface or, optionally, an annular collar having a precisely dimensioned inner diameter is welded in the aperture, (the latter not shown in the drawing to avoid belaboring the obvious). The inner diameter of aperture 13 and the outer diameter of a bushing portion of fitting 14 are dimensioned to coincide to facilitate a forced interconnection of the bushing portion within the aperture. This interconnection is nearly permanent in nature and by itself is watertight under most conditions; however, since extreme pressures in high-pressure medium 11 are expected, a flanged portion 16 and a nut portion 17 are each provided with an annular recess 18 in which there is disposed an o-ring 19. Prior to inserting the fitting and tightening the nut, the inner and outer surfaces of the pressure hull surrounding the aperture are shaped to have a proturberance free smooth surface and to be free from grit and other fouling. Coating both o-rings 19 and the smoothed surfaces with a silicon grease further ensures a sealed mating with the pressure hull.

Forcefully inserting bushing portion 15 in aperture 13 brings flanged portion 16 to rest on the outer surface of pressure hull 10, and o-ring 19 in the flanged fitting is deformed to present a sealed annular juncture. Similarly, nut portion 17 is threaded onto the inner end of bushing portion 15 to press its o-ring 19 against the inner surface of the pressure hull. After nut 17 has been sufficiently tightened, a watertight joint has been created which has demonstrated a capability for fail-safe operation at depths in excess of 2,000 feet.

The outer surfaces of the opposite longitudinal extremes of data transferring fitting 14 are threaded to provide a mounting surface for correspondingly threaded cap members 20 and 21 and an opening 22 or 23 is provided in each of the cap members for receiving the bundle of light-transmitting fiber optics 24 or 25.

The particular size or type of fiber optics in the bundles used is selected from the wide variety of commercially available light transmitting members. A multichannel data capability in which discrete sets of fibers simultaneously relay different signals or a single channel pulsed mode of operation is anticipated depending upon the job at hand. The ends of each of the bundles of fiber optics are held in a ferrule 26 or 27 and the axially exposed surfaces 24a and 25a of each of the fiber optics bundles are polished to create a fiber-optic faceplate to permit an accurate readout of the transmitted optical signals. An annular rim 26a or 27a is disposed on each of the ferrules and serves to limit the length that exposed polished ends 24a and 25a extend inside fitting 14.

The fitting as described to this point would, firstly, lack the watertight integrity necessary for its use in a marine environment due to the fact that a path for water is created between openings 22 and 23. Secondly, it is highly doubtful that optical radiation representative of data could be transmitted between the exposed polished ends 24a and 25a due to their separation.

For the purposes of transmitting data between the two bundles of fiber optics while ensuring watertight integrity, a tapered bore 28 is reamed coaxially in data transfer fitting 14. A conical-frustum-shaped plug 29 is disposed in bore 28 which is, in turn, provided with a coaxial bore 30, and, within which a means for coupling 31 the optical radiation between the bundles of fiber optics 24 and 25 is fitted.

Conical-frustum plug 29 is, optionally, a metal or plastic-like sleeve appropriately machined to correspond to the inner dimensions of tapered bore 28 and the outer dimensions of coupling means 31. When this design is chosen, it has been found expedient to apply a thin coating of epoxy adhesive between the joints created between the surfaces of tapered bore 28 and conical-frustum plug 29 and between the surfaces of coaxial bore 30 and coupling means 31. After the epoxy adhesive hardens, an extremely tough joint is created where the adhesive has been applied for this material inherently possesses a high-shear strength to virtually eliminate any possibility of failure. An alternate method for forming the conical-frustum plug 29 calls for molding the plug in place inside the fitting by simply pouring a sufficient quantity of adhesive in tapered bore 28 when ferrules 26 and 27 are appropriately aligned and optically interconnected with coupling means 31.

Looking now to the coupling means, a preferred design assumes the shape of a bundle of tapered fiber optics which when fused together conforms to the inner dimensions of coaxial bore 30. Tapered fiber optics are in widespread use and possess the known property of increasing the light intensity at the tapered end with respect to the incident light on the wider end. Another advantage in using a tapered bundle is that it mechanically cooperates with conical-frustum plug 29 carried in tapered bore 28 to resist a high-pressure differential force created between high-pressure medium 11 and lower-pressure medium 12.

Conventional hull penetrators feeding several electrical conductors through a single fitting, creates the problems associated with cross talk between adjacent data channels. However, in the present invention cross talk is not of great concern due to the invention's use of fiber optics as the data transfer member within the fitting.

Use of fiber optics has also resulted in a substantial reduction of the size of the fitting itself. The broadband width and multichannel data capability of a relatively small-diametered bundle of fiber optics are well known. A single fitting fabricated in accordance with the teachings of the present invention easily serves as a conduit for a command and control functions normally carried by many electrical conductors reaching through a number of conventional hull penetrators. By reason of the invention's small dimensions, such a fitting would not seriously interfere with the structural integrity of a submersible's hull.

Furthermore, by having a fitting of small dimensions the hazard of structurally overloading the interconnection between the fitting and the hull is significantly reduced when compared to the interconnections required by large conventional hull penetrators. To elaborate, with the present invention the fitting had only a 1 inch diameter and the surface area interposed between the high pressure medium and the low pressure medium is small. This small surface area reduces the total amount of pressure exerted on the fitting. The resultant shear forces working along the boundaries between the fitting and the hull and along the tapered bores are a fraction of the magnitude of these forces acting on boundaries in the larger conventional fittings having diameters of 4 to 5 inches.

Figure 2:
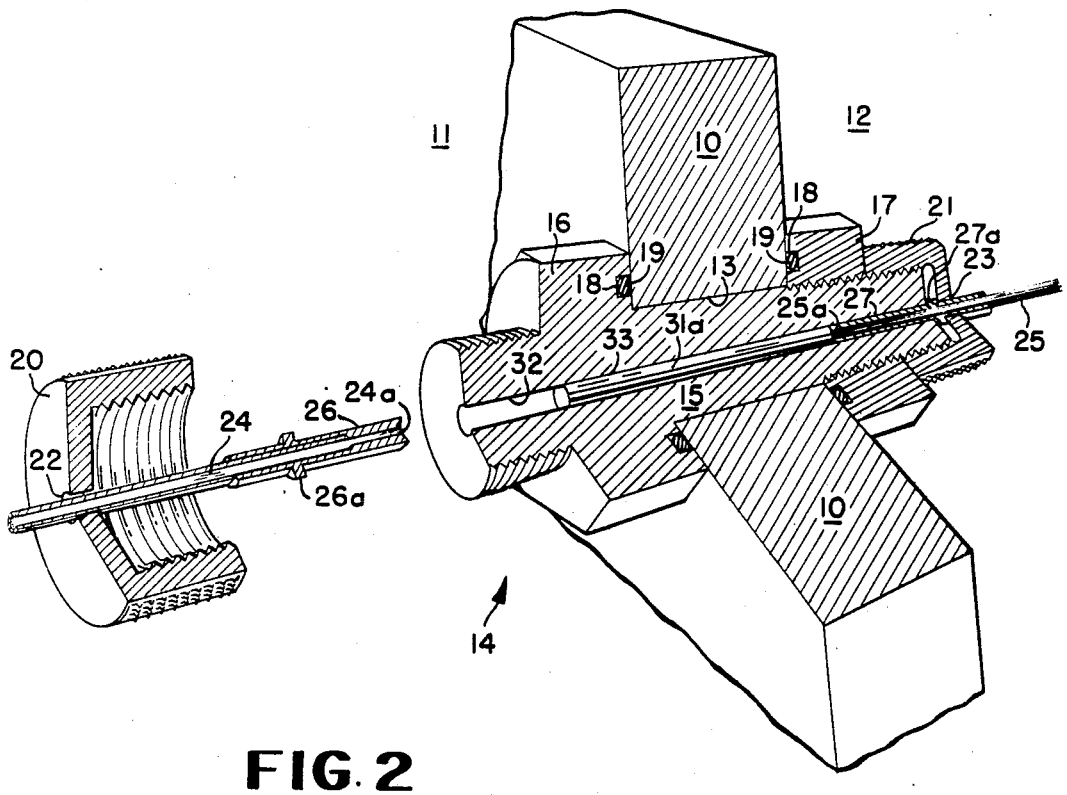
FIG. 2 is an isometric view partially in section of another embodiment of the invention.

Because the fitting is made smaller by its advantageous use of fiber optics, a less complicated alternate embodiment has evolved and is shown in FIG. 2. A coaxial bore 32 is formed throughout the length of fitting 14 and has an internal diameter substantially corresponding to the outer diameter of ferrules 26 and 27. In this embodiment, however, the coupling means is a cylindrically shaped plug of glass 31a having a graded refractive index throughout for focusing and separating discrete data channels between fiber-optics bundles 24 and 25. A typical glass plug successfully used in this invention is a plug having a parabolic graded refractive index marketed by the Nippon Electric Company under the trade designation "SELFOC." The cylindrically shaped plug has a lateral dimension to allow its being slid onto bore 32 and has a longitudinal dimension to ensure its reaching to and being placed adjacent exposed ends 24a and 25a. To ensure watertight integrity of the embodiment of FIG. 2, a thin coating of an epoxy adhesive 33 is disposed on the lateral surfaces of plug 31a and the inside of coaxial bore 32. After hardening, a joint has been created which more than adequately resists the shearing force created by the pressure differential between the high pressure medium and the lower pressure medium.

Only a bundle of tapered fiber-optics and the "SELFOC" plug have been discussed functioning in the coupling means capacity. Obviously, one or more bundles of parallel fiber-optics fused in a cylinder could be substituted or the larger diametered light-transmitting elements marketed by the Dupont Corporation of Wilmington, Del. under the trademark "DROFON" could be used.

In all the aforedescribed modifications of the inventive concept the optical matching between exposed ends 24a and 25a and coupling means 31 is enhanced by interposing a suitable optical matching grease. The particular grease selected is a matter of choice depending on the optical properties of the elements to be coupled together.

Obviously, many modifications and variations of the present invention are possible in the light of the above teachings, and, it is therefore understood that within the scope of the disclosed inventive concept, the invention may be practiced otherwise than specifically described.

What is claimed is:

1. In a sealed fitting extending through a structural member separating a high pressure medium from a lower pressure medium, an improvement for ensuring the optical transmission of data therethrough is provided comprising:

first optical means connected to one end of said fitting for transferring optical signals representative of data between the high pressure medium and said fitting;

second optical means connected to the other end of said fitting for transferring said optical signals between said lower pressure medium and said fitting;

means for defining a coaxial bore in said fitting reaching from the first transferring means to the second transferring means;

means disposed in said coaxial bore for optically coupling said optical signals between said first transferring means and said second transferring means; and a coating of an epoxy adhesive interposed between the coupling means and said coaxial bore and extending the full length of the coupling means for securing and for sealing the coupling means in said coaxial bore to ensure the passive guidance of said optical signals while maintaining the watertight integrity of said fitting.

2. A fitting according to claim 1 in which said coaxial bore is cylindrically shaped and the coupling means is at least one light transmitting element shaped in a cylindrical configuration having an outer diameter smaller than the inner diameter of the cylindrically shaped coaxial bore.

3. A fitting according to claim 1 in which said coupling means is a bundle of fiber optics fused together in a cylindrical shape and the opposite ends of which are polished.

4. A fitting according to claim 2 in which said coupling means is a single cylinder of glass having a graded refractive index from its axis to its periphery for focusing said optical signals.

5. A fitting according to claim 1 in which said coaxial bore has a conical-frustum configuration oriented to place its wider end facing said high pressure medium and its narrower end facing said lower pressure medium.

6. A fitting according to claim 5 in which the coupling means is at least one light transmitting element having a tapered cross-sectional configuration with its wider end facing said high pressure medium and its narrower end facing said lower pressure medium to better withstand the pressure differential created across said fitting.

7. A fitting according to claim 5 in which the coupling means is a bundle of tapered fiber optics fused together in a tapered cross-sectional configuration with its wider end facing said high pressure medium and its narrower end facing said lower pressure medium to better withstand the pressure differential created across said fitting.

8. A fitting according to claim 6 in which the securing and sealing means has a conical-frustum configuration and a longitudinal cavity shaped to receive the tapered light transmitting element therein.

9. A fitting according to claim 7 in which the securing and sealing means has a conical-frustum configuration and a longitudinal cavity shaped to receive the tapered bundle of fiber optics therein.

* * * * *